United States Patent
Hsiao et al.

(10) Patent No.: US 9,760,459 B2
(45) Date of Patent: Sep. 12, 2017

(54) SYNCHRONIZATION POLICIES AMONG NODES

(71) Applicant: International Business Machines Corporation, Armonk, NY (US)

(72) Inventors: Wan-Tseng Hsiao, New Taipei (TW); Tzuching Kuo, Taipei (TW); Chih-Hsiung Liu, Taipei (TW); Yi-Ching Peng, New Taipei (TW); Chen-Hsi Tsai, Taipei (TW); Ming-Yu Wei, Keelung (TW)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/735,208

(22) Filed: Jun. 10, 2015

(65) Prior Publication Data
US 2016/0364296 A1    Dec. 15, 2016

(51) Int. Cl.
G06F 11/20    (2006.01)
G06F 11/14    (2006.01)
H04L 29/08    (2006.01)

(52) U.S. Cl.
CPC ...... *G06F 11/2082* (2013.01); *G06F 11/1402* (2013.01); *H04L 67/1095* (2013.01); *G06F 2201/805* (2013.01)

(58) Field of Classification Search
CPC ............. G06F 11/1402; G06F 11/2082; H04L 67/1095
See application file for complete search history.

(56) References Cited

U.S. PATENT DOCUMENTS 5,838,918 A    11/1998   Prager et al.
6,205,448 B1 *  3/2001   Kruglikov ......... G06F 17/30581
(Continued)

FOREIGN PATENT DOCUMENTS

JP    2009500716 A    1/2009

OTHER PUBLICATIONS

Habib, M., "Provisioning Algorithms for Service Differentiation in Middleware Appliance Clusters," thesis submitted to the Graduate Faculty of North Carolina State University, 84 pages, Raleigh, North Carolina, 2009.

(Continued)

*Primary Examiner* — Matt Kim
*Assistant Examiner* — Paul Contino
(74) *Attorney, Agent, or Firm* — Nicholas D. Bowman

(57) ABSTRACT

Services associated with first and second nodes are managed. As part of the management, the first node receives a request to modify the services. A synchronization policy is identified. The synchronization policy requires that modifications attempted on the set of services on the first node also be attempted on the second node. In response to the request, an attempt is made to modify the set of services on the first node. Further, in response to the request and pursuant to the synchronization policy, the second node is caused to attempt to modify the set of services. The synchronization policy is identified as a relaxed synchronization policy. A determination is made that the attempt to modify the set of services on the second node failed. Based on identifying that the synchronization policy is a relaxed synchronization policy, the attempt to modify the set of services on the first node continues.

17 Claims, 10 Drawing Sheets

(56) References Cited

U.S. PATENT DOCUMENTS

| | | | |
|---|---|---|---|
| 7,577,661 B2 | 8/2009 | Bankston et al. | |
| 7,644,141 B2 | 1/2010 | Branda et al. | |
| 7,650,397 B2* | 1/2010 | Price | G06F 9/4862 709/220 |
| 7,941,521 B1 | 5/2011 | Petrov et al. | |
| 8,255,509 B2 | 8/2012 | Draca et al. | |
| 8,775,678 B1* | 7/2014 | Cooley | G06F 17/30179 709/248 |
| 9,535,769 B2* | 1/2017 | Maes | G06F 9/54 |
| 2009/0222812 A1 | 9/2009 | Nissen et al. | |
| 2010/0036911 A1 | 2/2010 | Sankaran | |
| 2010/0235321 A1* | 9/2010 | Shukla | G06F 17/30902 707/610 |
| 2011/0307444 A1 | 12/2011 | Cox et al. | |
| 2012/0309464 A1* | 12/2012 | Lim | H04M 1/72522 455/566 |
| 2013/0064336 A1* | 3/2013 | Schadt | G06F 17/30176 375/354 |
| 2013/0191881 A1 | 7/2013 | Linden et al. | |
| 2013/0263289 A1* | 10/2013 | Vijayan | G06F 21/60 726/31 |
| 2013/0275553 A1* | 10/2013 | Shilo | H04L 67/1095 709/217 |
| 2013/0318341 A1 | 11/2013 | Bagepalli et al. | |
| 2014/0359602 A1* | 12/2014 | Sawaya | G06F 8/62 717/176 |
| 2014/0379811 A1* | 12/2014 | Chan | G06F 21/00 709/205 |
| 2015/0317175 A1* | 11/2015 | Tada | G06F 11/20 718/1 |
| 2016/0140197 A1* | 5/2016 | Gast | G06F 17/30575 707/626 |
| 2016/0366222 A1* | 12/2016 | Mahkovec | G06F 17/30899 |

OTHER PUBLICATIONS

Habib et al., "Service Differentiation in Multi-tier Application Architectures," Software and Data Technologies, Communications in Computer and Information Science vol. 50, 2011, pp. 46-58, Copyright Springer-Verlag Berlin Heidelberg 2011.

Mell, P. et al., "The NIST Definition of Cloud Computing," Recommendations of the National Institute of Standards and Technology, U.S. Department of Commerce, Special Publication 800-145, 7 pgs., Sep. 2011.

\* cited by examiner

FIG. 3A

NODE 1 NORMAL DISPLAY — 301

| Service Name | Type | Version | Average Daily Users |
|---|---|---|---|
| Word Master | Word Processing | 7.02 | 112 |
| Hack Proof | Data Security | 5LX | 952 |
| Spreadsheet Master | Spreadsheet Organization | 1.25 | 93 |
| Digital Cabinet | File System Management | 3 | 321 |

[ ADD SERVICE ]  [ DELETE SERVICE ]  [ REVISE SERVICE ]

300 — Tab A / Tab B — 311, 321

FIG. 3B

NODE 1 SYNCHRONIZATION DISPLAY — 302

Policy 19XV42 — 332

| Service Name | Type | Policy ID | Policy Name | Type | Currently Participating Nodes |
|---|---|---|---|---|---|
| Word Master | Word Processing | 19XV42 | Master Accounting Suite | Strict | 1, 5, 27, 99 |
| Spreadsheet Master | Spreadsheet Organization | 19XV42 | Master Accounting Suite | Strict | 1, 5, 27, 99 |

[ ADD SERVICE ]  [ DELETE SERVICE ]  [ REVISE SERVICE ]

300 — Tab A / Tab B — 312, 321

SYNCHRONIZATION POLICIES AMONG NODES

BACKGROUND

The present disclosure relates to distributed computing environments and, more specifically, to synchronization of services among nodes of such environments.

Services are becoming widely available in distributed (e.g., networked) computing environments. In some embodiments, a service may refer to an application or other resource that is hosted on one computer (e.g., a node) and is generally available for use by other computers (e.g., clients). A service may include an endpoint on a node (e.g., device, appliance, server) that clients can access. This endpoint may, in some situations, be continuously available for one or more clients. Services may include web services which are offered over the Internet. In some situations, services may be designed for widespread use based on open communication protocols.

SUMMARY

According to embodiments of the present disclosure, aspects of the disclosure may include a method for managing a set of services associated with a first node and further associated with a second node. As part of the method, the first node receives a request to modify the set of services on the first node. A synchronization policy associated with the set of services is identified. The synchronization policy requires that modifications attempted on the set of services on the first node also be attempted on the set of services on the second node. In response to the request, an attempt is made to modify the set of services on the first node. Further, in response to the request and pursuant to the synchronization policy, the second node is caused to attempt to modify the set of services on the second node. The synchronization policy is identified as a relaxed synchronization policy. A determination is made that the attempt to modify the set of services on the second node failed. Based on identifying that the synchronization policy is a relaxed synchronization policy and despite the determination, the attempt to modify the set of services on the first node continues.

According to embodiments of the present disclosure, aspects of the disclosure may further include a computer program product for managing a set of services associated with a first node and further associated with a second node. The computer program product includes a computer-readable medium having program instructions embodied thereon. The program instruction are configured to cause a computer to perform a method. As part of the method, the first node receives a request to modify the set of services on the first node. A synchronization policy associated with the set of services is identified. The synchronization policy requires that modifications attempted on the set of services on the first node also be attempted on the set of services on the second node. In response to the request, an attempt is made to modify the set of services on the first node. Further, in response to the request and pursuant to the synchronization policy, the second node is caused to attempt to modify the set of services on the second node. The synchronization policy is identified as a relaxed synchronization policy. A determination is made that the attempt to modify the set of services on the second node failed. Based on identifying that the synchronization policy is a relaxed synchronization policy and despite the determination, the attempt to modify the set of services on the first node continues.

According to embodiments of the present disclosure, aspects of the disclosure may further include a first node for managing a set of services associated with the first node and further associated with a second node. The first node includes a memory and processor in communication with the memory. The processor is configured to perform a method. As part of the method, a request to modify the set of services on the first node is received. A synchronization policy associated with the set of services is identified. The synchronization policy requires that modifications attempted on the set of services on the first node also be attempted on the set of services on the second node. In response to the request, an attempt is made to modify the set of services on the first node. Further, in response to the request and pursuant to the synchronization policy, the second node is caused to attempt to modify the set of services on the second node. The synchronization policy is identified as a relaxed synchronization policy. A determination is made that the attempt to modify the set of services on the second node failed. Based on identifying that the synchronization policy is a relaxed synchronization policy and despite the determination, the attempt to modify the set of services on the first node continues.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 3A illustrates a first view of a graphical user interface (GUI) display, the first view including a normal display dashboard, in accordance with embodiments of the present disclosure.

FIG. 3B illustrates a second view of the GUI display of FIG. 3A, the second view including a synchronization display dashboard, in accordance with embodiments of the present disclosure.

Figure 1:
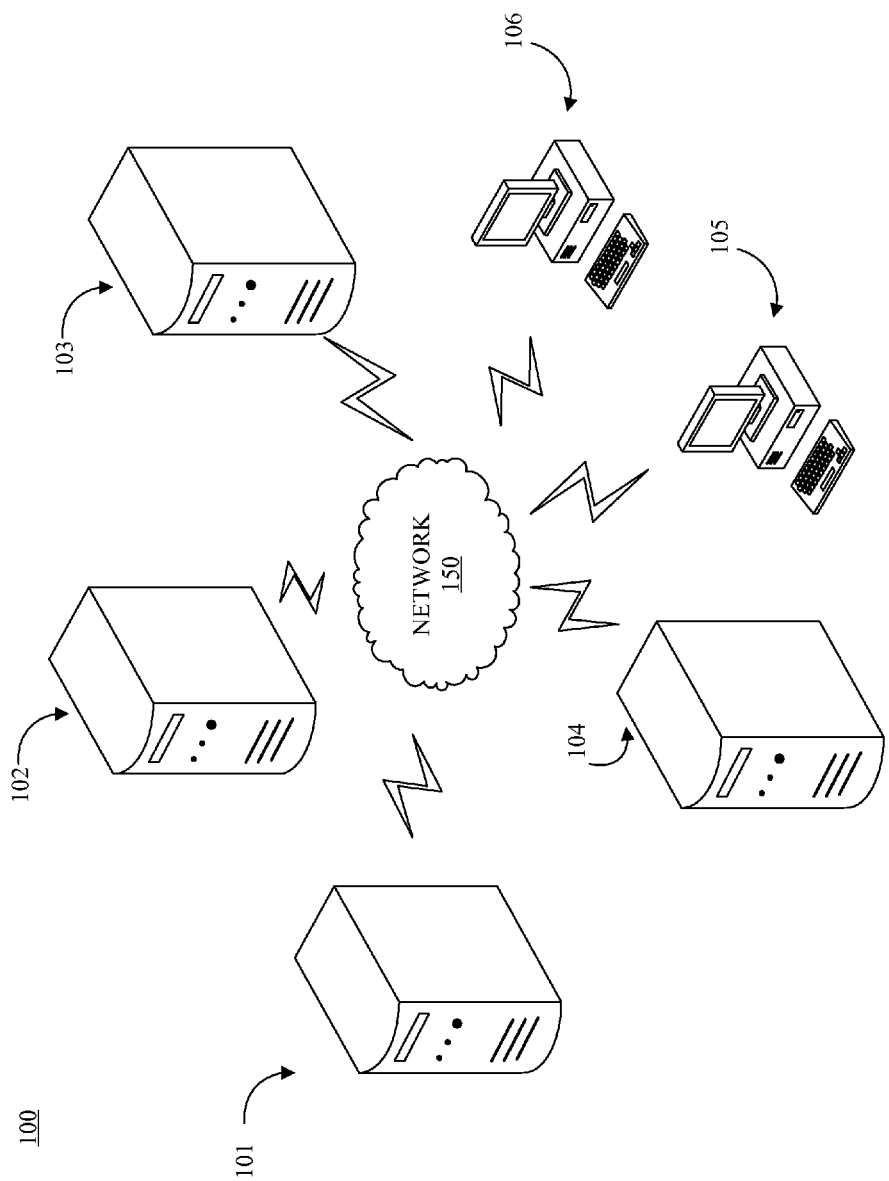
FIG. 1 illustrates a diagram of an example computing environment, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributed computing environments and, more specifically, to synchronization of services among nodes of such environments. While the present disclosure is not necessarily limited to such applications, various aspects of the disclosure may be appreciated through a discussion of various examples using this context.

In some situations, certain services available over the Internet may have reputations for being continuously available and highly reliable. In order to maintain a high degree of availability, care may need to be taken in the design and implementation of these services. This may include the need to have the same service configured on multiple nodes (e.g., on both a primary server and a backup server, or on a set of servers that each serve geographically distinct areas). This may result in a significant amount of redundant work each time a modification is made to a service or set of services. For example, a simple path change for a directory of a service on one node may require that the change be made not only to the service on that node, but also to that same service on the other nodes of the network. The system administrator may be required to manually make this same change multiple times (e.g., once per node with multiple nodes being present). Without such efforts to maintain the configurations of the service across nodes, problems (such as service interruptions) may result when a client switches from using a particular service on one node to using that same service on another node.

Furthermore, in some configurations, centralized servers or repositories may be used to manage the configurations of multiple nodes. This may require extra effort to set up these servers and, when such a server goes down, service configuration management work may become impossible in the network relying on that central server.

In some embodiments, synchronization policies may be used to maintain configurations of services across related nodes. As used herein, a synchronization policy may require, in some embodiments, that an attempt to modify a covered service on one node that participates in the policy must also be attempted on the same service on other nodes participating in the policy. In accordance with such a policy, a system administrator's instruction to modify a set of services on one node may be automatically propagated to other nodes that have the same set services and participate in the same synchronization policy.

Further, in some embodiments, synchronization policies may be either strict or relaxed. Strict synchronization policies may require that upon determining that the attempted modification has failed on one node, all of the remaining nodes must abort their own attempts to make the modification and revert back to their pre-attempt configurations. Further, in some embodiments, a strict-type policy may prohibit new services from being added to the applicable synchronization policy or, in the alternative, may only allow a user with special credentials to add a new service to the synchronization policy. Employing a strict synchronization policy may, in some embodiments, help to ensure that service configurations remain the same between the same services on related nodes.

In some embodiments, relaxed synchronization policies, in contrast to strict synchronization policies, may require only that the attempt to perform a particular modification be made on all of the nodes participating in the policy. Thus, even if the attempted modification fails on one or more of the nodes, the remaining nodes may continue to complete the modifications and use the services as modified. Further, the attempt made on each node to implement the modification may only be a best efforts attempt.

Further, in some embodiments, each node may be associated with a normal mode and a synchronization mode. When a user logs on to a node in a normal mode, the user may be able to view/modify any of the services available on that node (e.g., via a normal display). In contrast, when the user switches to a synchronization mode, the user may be able to limit the display (e.g., a synchronization display) to showing only services that are governed by a particular synchronization policy selected by the user.

Further, in some embodiments, rather than employing a centralized repository of service configuration data for all machines in a network, users may be able to connect to any peering node in a network and then control the configuration of not only this node, but also other nodes that participate in the same synchronization policies as this node. This may result in a flexible way to specify a subset of service configurations to be synchronized for each node among two or more nodes.

Referring now to the figures, shown in FIG. 1 is a block diagram of an example computing environment 100, in accordance with embodiments of the present disclosure. In some embodiments, the computing environment 100 may include multiple computers, including nodes 101, 102, 103, and 104 and clients 105 and 106 in communication with each other over network 150. The network 150 may be implemented by any number of any suitable remote or local communications media (e.g., wide area network (WAN), local area network (LAN), Internet, intranet, hardwire, wireless link). In some embodiments, the computing environment 100 may be implemented within a cloud computing environment, as described in more detail herein. Consistent with various embodiments, a cloud computing environment may include a network-based, distributed data processing system. Further, the cloud computing environment may include any number of computers (e.g., hundreds or thousands of them or more), disposed within one or more data centers and configured to share resources over the network 150.

In some embodiments, nodes 101-104 may represent servers (e.g., appliances) or groups of servers. In some embodiments, nodes 101-104 may together represent a cluster. Each server may include a local terminal for accessing data thereon. The servers may act as hosts for, or otherwise be associated with, services (e.g., web services)

that are provided over the network 150 to one or more of the clients 105, 106. In some embodiments, one or more of the clients 105, 106 may be used by system administrators or other users to login and view or modify the configurations of one or more of the nodes 101-104. In some embodiments, the computing environment 100 may be a peer to peer network, wherein each of the nodes 101-104 may, at least to some extent, act as servers for each other. This may reduce or eliminate the need for a central server dedicated to storing configuration and synchronization information about the environment.

Figure 2:
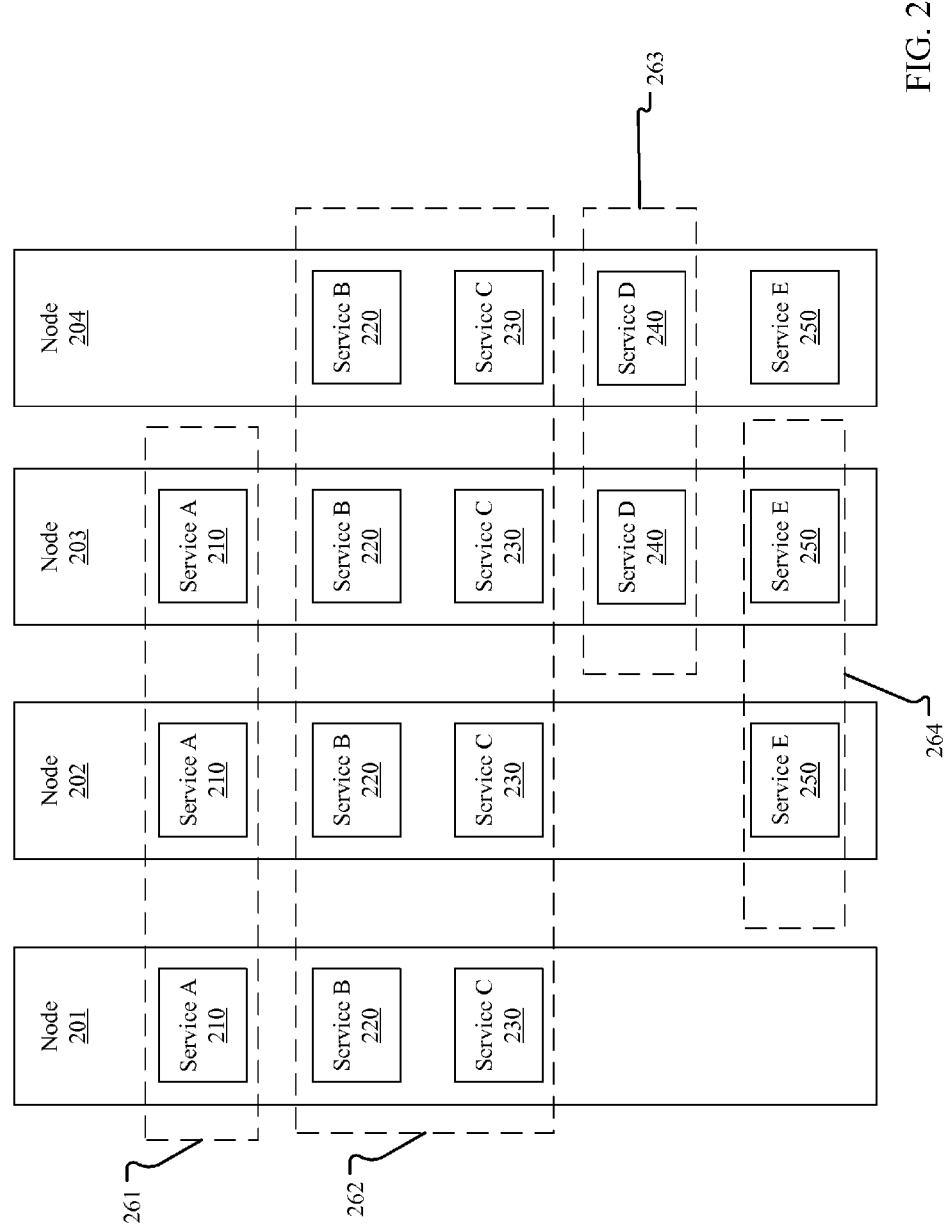
FIG. 2 illustrates a block diagram of nodes that host a plurality of services, and which are linked pursuant to a plurality of synchronization policies, in accordance with embodiments of the present disclosure.

Referring now to FIG. 2, shown is a block diagram of nodes 201, 202, 203, and 204 that host a plurality of services 210, 220, 230, 240, and 250, and which are linked pursuant to a plurality of synchronization policies 261, 262, 263, and 264, in accordance with embodiments of the present disclosure.

As shown, node 201 hosts Services A, B, and C; node 202 hosts Services A, B, C, and E; node 203 hosts Services A, B, C, D, and E; and node 204 hosts Services B, C, D, and E. The nodes 201-204 are linked by the synchronization policies 261-264 represented by dash-lined rectangles. Specifically, synchronization policy 261 includes Service A on nodes 201, 202, and 203; synchronization policy 262 includes Services B and C on nodes 201, 202, 203, and 204; synchronization policy 263 includes Service D on nodes 203 and 204; and synchronization policy 264 includes Service E on nodes 202 and 203.

In some embodiments, nodes may broadcast (or otherwise communicate) their own synchronization policies and listen for broadcasts from other nodes about other synchronization policies in which they may wish to join. For example, node 204 may receive a broadcast about synchronization policy 264 from nearby node 203 and, upon learning the details of the policy, node 203 may choose to join the policy by synchronizing its Service E to the synchronization policy 264 and notifying the nodes 202 and 203 (e.g., via a broadcast) that it has joined the synchronization policy 264.

Several features of synchronization polices are made apparent by the diagram of FIG. 2. For example, in some embodiments synchronization policies may encompass more than one service, as is the case with synchronization policy 262, which includes both Service A and Service B. For another example, in some embodiments synchronization policies may not encompass all instances of a specific service within a group of related nodes, as is the case with synchronization policy 264, which covers Service E on nodes 202 and 203 but not Service E on node 204 (for example, because node 204 does not participate in synchronization policy 264).

Furthermore, it is apparent from the diagram of FIG. 2 that, in some embodiments, synchronization policies may be helpful in allowing nodes to be partially, rather than fully-synchronized (e.g., two nodes may offer both some of the same services in a synchronized manner and some other services that are unsynchronized or different). This may mean that a user may be able to dictate which portion of each machine will be synchronized with other machines and which portions will remain independent from other machines.

Referring now to FIGS. 3A and 3B, shown are two views of a graphical user interface (GUI) display 300, in accordance with embodiments of the present disclosure. As depicted, GUI display 300 includes two dashboards 301 and 302, which may be configured for use as part of an application for managing services hosted on a particular node (node 1 in this example). The GUI display 300 may be usable by, for example, a system administrator responsible for monitoring the status of node 1. The system administrator may view the GUI display 300 via a computer monitor (e.g., a personal computer screen, a smart phone display) that is either locally or remotely connected to the node 1. In some embodiments, a user may be able to switch the application back and forth between a normal mode (wherein a normal display dashboard 301 may be shown via the GUI display 300) and a synchronization mode (wherein a synchronization display dashboard 302 may be shown via the GUI display 300) by clicking on tabs A and B, respectively. Using the GUI display 300, the user may be able to modify the configuration of node 1.

Referring now to FIG. 3A specifically, included in normal display dashboard 301 is a service listing table 311 and service modification panel 321. The service listing table 311 includes a list of services that are hosted on node 1 along with additional categories of information (service name, service type, version of the service, and average number of daily users of the service on node 1) about each particular service. For example, the second row of service listing table 311 shows that node 1 hosts a service called Hack Proof that is a data security service. Further, the specific version of Hack Proof that is hosted is version 5LX, and the average daily number of clients that use Hack Proof on node 1 is 952.

The service modification panel 321 may be configured for a user to select how services should be modified. As shown, the service modification panel 321 includes an add service button, a delete service button, and a revise service button. By selecting these options the user may be able to modify one or more of the services offered by node 1. For example, clicking the add service button could bring up a list of additional services that the user could choose to install on node 1. For another example, by highlighting a specific service from the service listing table 311 and clicking on the delete service button, the selected service may be uninstalled from node 1. For yet another example, clicking the revise service button could allow a user to view specific aspects of the services hosted on node 1 (e.g., how the services are indexed, the source code for the services) and from there could allow the user to revise or modify specific aspects of the installed services.

In some embodiments, service listing table 311 may be arranged in any suitable manner and may be designed to include any other categories of information that a user may deem relevant to managing services on node 1. Examples of other categories may include patches added to the service, node CPU usage by the service, and date of last update to the service.

Referring now to FIG. 3B specifically, included in synchronization display dashboard 302 is a synchronization policy table 312, the service modification panel 321, and a text-entry box 332. The text-entry box 332 may, in some embodiments, be used by a user for selecting a particular synchronization policy in which node 1 participates. In other embodiments, text-entry box 332 may be replaced by a drop-down menu that allows the user to select a synchronization policy of interest from among either the synchronization policies in which node 1 participates or all of the synchronization policies which are available to node 1 (e.g., including the policies that user could cause the node to join).

In the depicted example, the user has entered Policy 19XV42 into the text-entry box 332. This causes the depicted synchronization policy table 312 to include entries for only those services which are part of the synchronization policy having the identifier 19XV42. In this particular example, the selected synchronization policy of interest is called the Master Accounting Suite and includes the Word Master service and the Spreadsheet Master service. In addition to the name of the services, the type of services, the identifier of the policy, and the name of the policy, the categories depicted in synchronization policy table 312 also include the policy type (e.g., strict or relaxed) and a listing of the nodes that currently participate in the policy. Thus from the depicted synchronization policy table 312, a user may quickly learn that the selected synchronization policy is a strict synchronization policy and may further learn that in addition to node 1, nodes 5, 27, and 99 participate in the policy. In some embodiments, the synchronization policy table 312 may be arranged in any suitable manner and may be designed to include any other categories of information that a user may deem relevant to managing services on node 1, including, for example, those categories listed in service listing table 311.

In some embodiments, the synchronization policies may be enforced regardless of whether a user is modifying services in the normal mode or the synchronization mode. This may mean that a user that modifies a particular service while in normal mode may (even unknowingly) cause that change to be propagated to other nodes that participate in a synchronization policy involving that particular service. In other embodiments, changes made while a node is in normal mode may not be propagated to other nodes—effectively ignoring synchronization policies.

Figure 4:
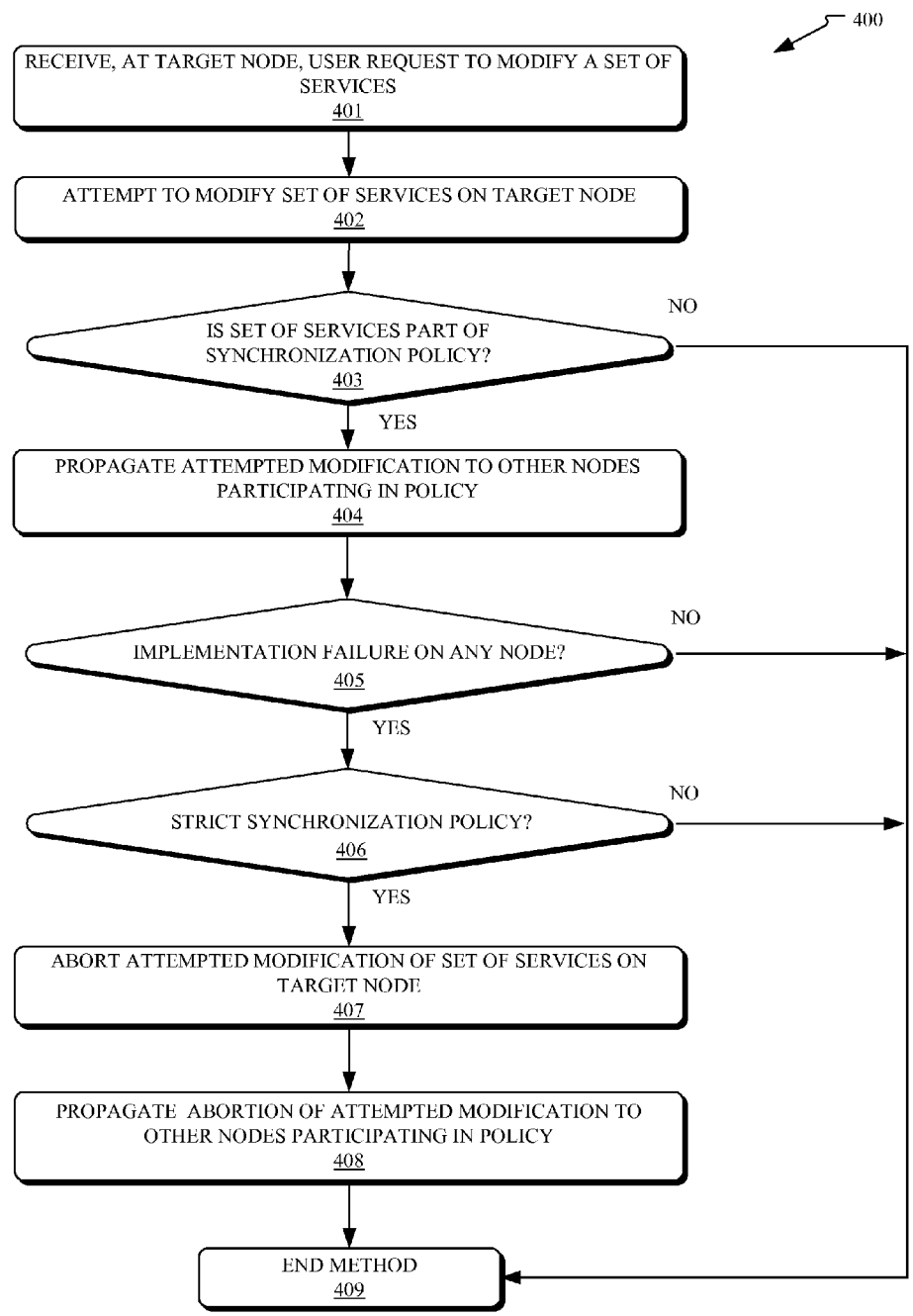
FIG. 4 illustrates a flowchart of an example method for modifying a set of services in a distributed computing environment incorporating at least one synchronization policy, in accordance with embodiments of the present disclosure.

Referring now to FIG. 4, shown is a flowchart of an example method 400 for modifying a set of services in a distributed computing environment incorporating at least one synchronization policy, in accordance with embodiments of the present disclosure. In some embodiments, one or more operations of the method 400 may be performed by components of a node, such as node 101 of FIG. 1. The method 400 may begin at operation 401, wherein a target node receives a user request to modify a set of services hosted on the target node. The set of services may include a single service or two or more services that are grouped together within the set. As used herein, modifying a set of services may refer, in some embodiments, to adding a service to the set of services, to deleting a service from the set of services, and to adjusting (e.g., modifying, debugging) a service of the set of services. The request to modify may be received, for example, from a terminal operated by a user.

Per operation 402, in response to the user request, the target node attempts to modify the set of services on the target node. This may involve, for example, attempting to delete code corresponding to a service to be removed, incorporating new code segments uploaded by the user into a service to be patched, or replacing an old version of a particular service with a newer version.

Per operation 403, a determination is made as to whether the set of services being modified is part of a synchronization policy. If not, then the method may be terminated, per operation 409 (e.g., with the target node attempting to complete the modifications to the set of services without needing to communicate the attempt to any other nodes). However, if the set of services is part of a synchronization policy, then, per operation 404, notice of the attempted modification as well as an instruction to perform the modification is propagated to the other nodes participating in the synchronization policy. The nodes receiving the request may then each attempt to perform the same modification on their corresponding sets of services. In some embodiments, the other nodes may each send notifications back to the target node that indicate whether the modification is proceeding successfully on their respective sets of services.

Per operation 405, a determination is made as to whether the attempt to implement the modification failed on one or more nodes associated with the synchronization policy. This may, in some embodiments, include an implementation failure on the target node itself. In some embodiments, the determination may be made based on a notification sent from a particular node to the target node indicating that the modification failed on that particular node. If the target node determines that no such failure has occurred, then the synchronization policy records may be updated and, per operation 409, the method may be terminated (e.g., with all of the nodes participating in the synchronization policy having the updated set of services).

However, if there is an implementation failure on one or more nodes, then, per operation 406, the target node may proceed to make a determination as to whether the synchronization policy is strict synchronization policy (versus a relaxed synchronization policy). If the synchronization policy is not a strict synchronization policy then, per operation 409, the method may be terminated (e.g., with the target node continuing to attempt to implement the modification despite notice that the modification failed on another node). However, if the synchronization policy is strict, then, per operation 407, the determination of the implementation failure on another node causes the target node to abort (e.g., discontinue) its own attempt to modify the set of services. This may involve canceling the modification attempt if it is still in progress or undoing the result of the modification attempt if it is has already been completed on the target node by the time notice of an implementation failure on another node is received by the target node.

Per operation 408, the target node notifies (e.g., propagates a notification to) the other nodes participating in the synchronization policy to abort each of their respective attempts to modify their respective sets of services. Per operation 409, the method terminates.

While embodiments of method 400 are described herein, many other variants of method 400 are also contemplated. For example, in some embodiments, a determination that the synchronization policy is strict (per operation 406) may mean that before any configuration change can be applied to the set of services on any node, the target node must first confirm that all of the nodes participating in the synchronization policy will be able to successfully make the change. This may involve, for example, testing each node to confirm that each modification will be implemented properly before allowing any of the nodes to operate using the modifications. Further, the modification may be implemented in stages with no node being able to proceed to the next stage of implementation until confirmation is received that every node has successfully completed the previous stage. Furthermore, in some embodiments, modifications may be imported (and applied) without being deployed until a check on all applicable nodes is performed. Then, after the check is completed, each node may deploy the changes (e.g., pursuant to its own individual deployment policy).

Figure 5:
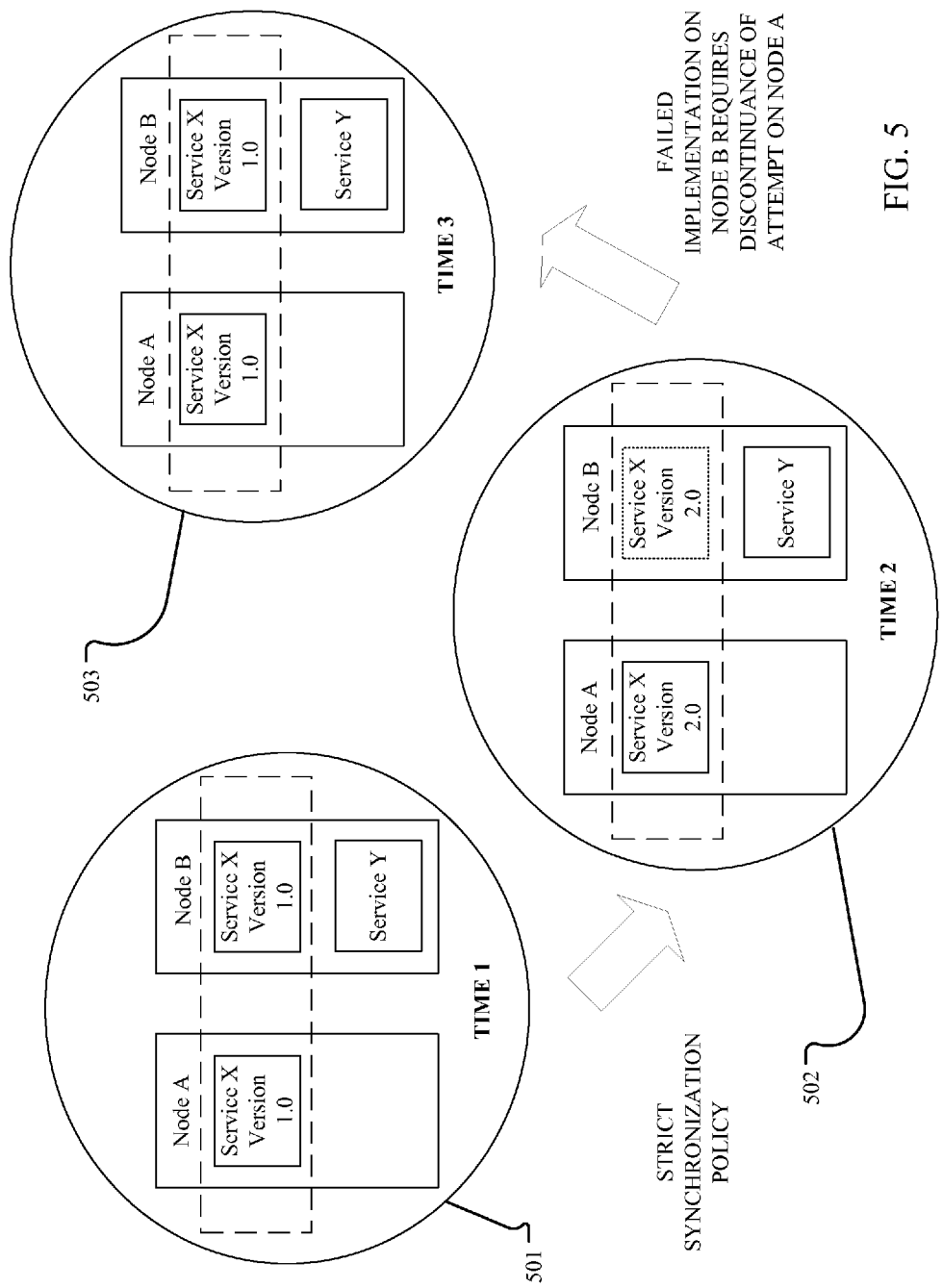
FIG. 5 illustrates a diagram showing changes in an environment over time as two nodes each attempt to implement an updated version of a service that is governed by a strict synchronization policy, in accordance with embodiments of the present disclosure.

Referring now to FIG. 5, shown is a diagram illustrating changes in an environment over time as two nodes each attempt to implement an updated version of a service that is governed by a strict synchronization policy, in accordance with embodiments of the present disclosure. As shown in the first circle 501 (representing the state of the environment at a first time, Time 1), the environment includes a two nodes, Node A and Node B. Both nodes host a version 1.0 of Service X. Node B also hosts Service Y. The nodes both participate in a synchronization policy (represented by the dash-lined rectangle) that governs modifications to Service X. In this example, the synchronization policy is a strict synchronization policy. At Time 1, a user of Node A attempts to perform an update on Node A. Specifically, the user attempts to update Service X to version 2.0 on Node A.

Because Service X is governed by the synchronization policy, the attempt to update Service X on Node A causes an attempt at performing the same update to Service X on Node B. As shown the second circle 502 (representing the state of the environment at a second time, Time 2), the update to version 2.0 is attempted on both nodes. To continue this example, the attempt to modify Service X on Node A proceeds well. On the other side, as represented by the dot-lined box in circle 502, the attempt to modify Service X on node B meets with failure.

Next, as shown in the third circle 503 (representing the state of the environment at a third time, Time 3), both nodes revert back to the version 1.0 of Service X. This occurs because of the failure of the attempt to modify Service X on Node B. More specifically, because the synchronization policy is a strict synchronization policy, the inability to implement version 2.0 on Node B meant that the version 2.0 of Service X could not be implemented on Node A either.

Figure 6:
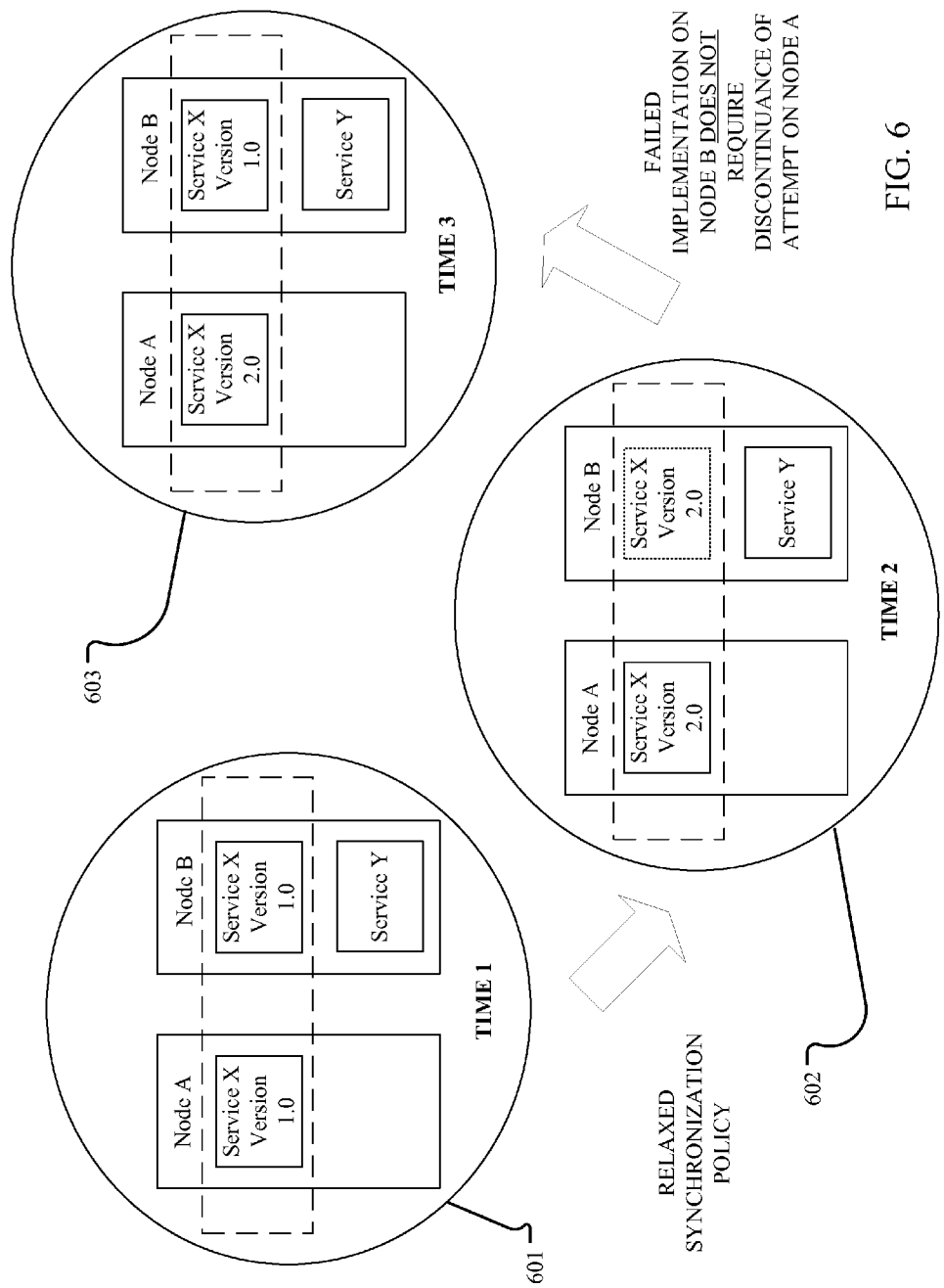
FIG. 6 illustrates a diagram showing changes in an alternative form of the environment shown in FIG. 5, wherein the service to be updated is governed by a relaxed synchronization policy rather than a strict synchronization policy, in accordance with embodiments of the present disclosure.

Referring now to FIG. 6, shown is a diagram illustrating changes in an alternative form of the environment shown in FIG. 5, wherein the service to be updated is governed by a relaxed synchronization policy rather than a strict synchronization policy, in accordance with embodiments of the present disclosure. As shown in the first circle 601 (representing the state of the environment at a first time, Time 1, and in the alternate form), the environment still includes a two nodes, Node A and Node B. Both nodes still host a version 1.0 of Service X. Node B also still hosts Service Y. The nodes still both participate in a synchronization policy (represented by the dash-lined rectangle) that governs modifications to Service X. However, in this alternate example, the synchronization policy is a relaxed synchronization policy. At Time 1, a user of Node A attempts to perform an update on Node A. Specifically, the user attempts to update Service X to version 2.0 on Node A.

Because Service X is governed by the synchronization policy, the attempt to update Service X on Node A causes an attempt at performing the same update to Service X on Node B. As shown the second circle 602 (representing the state of the environment at a second time, Time 2, and in the alternate form), the update to version 2.0 is attempted on both nodes. To continue this alternate example, the attempt to modify Service X on Node A proceeds well. On the other side, as represented by the dot-lined box in circle 602, the attempt to modify Service X on Node B meets with failure.

Next, as shown in the third circle 603 (representing the state of the environment at a third time, Time 3, and in the alternate form), rather than both nodes reverting back to the version 1.0 of Service X, only Node B reverts back to version 1.0. Node A successfully completes the update to version 2.0 of Service X. This occurs because the synchronization policy is a relaxed synchronization policy, and, therefore, the implementation failure on one node may not impact whether the modification is completed on the remaining nodes participating the policy at issue.

Figure 7:
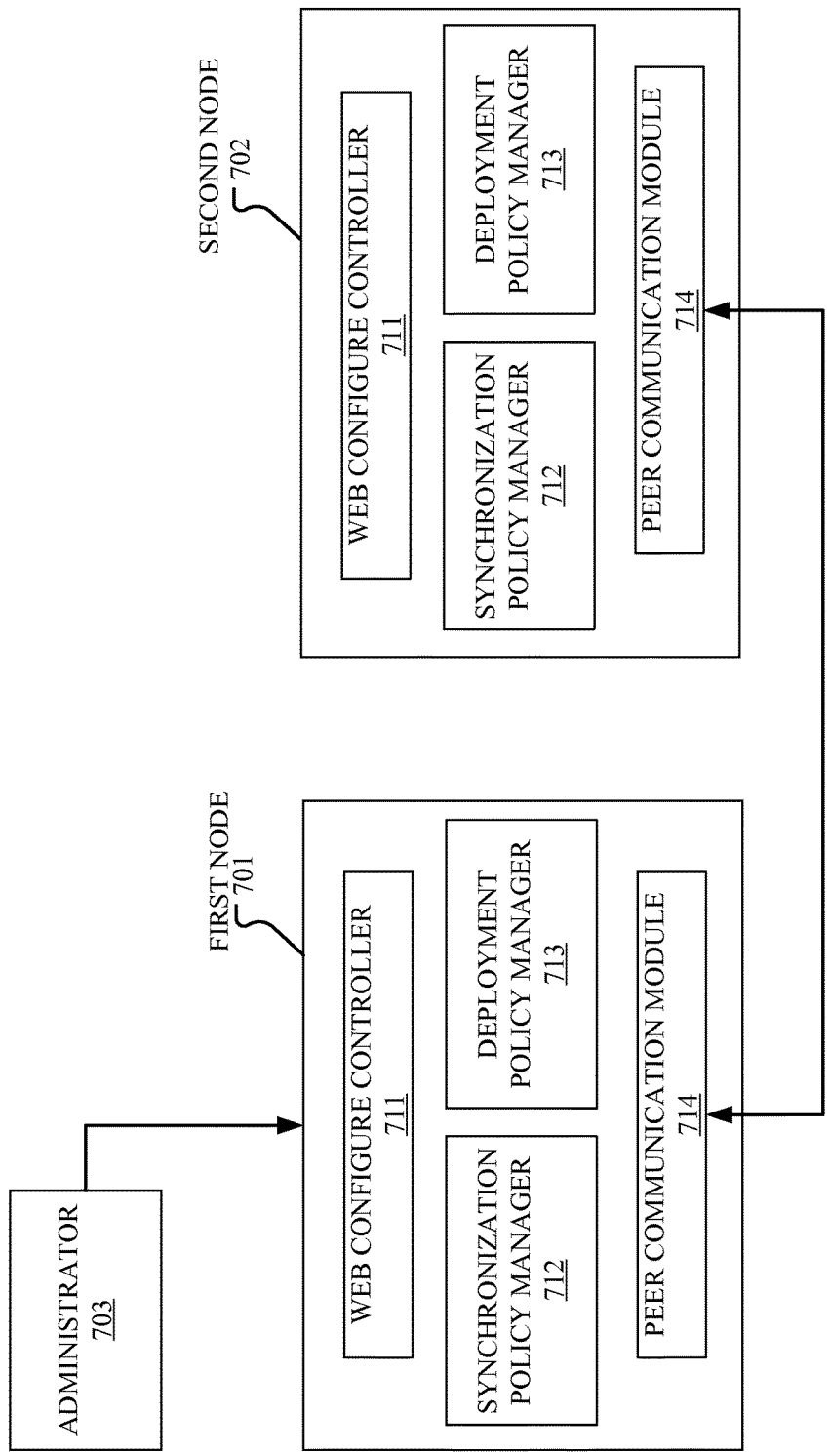
FIG. 7 illustrates a block diagram of example modules usable by a node, in accordance with embodiments of the present disclosure.

Referring now to FIG. 7, shown is a block diagram of example modules usable by a node, in accordance with embodiments of the present disclosure. As shown, a first node 701 is in communication with a second node 702. Other nodes (not shown) may be included in the same environment. As depicted, an administrator 703 may log on to first node 701 (or potentially second node 702). Each of the nodes 701 and 702 include a plurality of modules that may be usable for carrying out one or more operations of methods described herein. These modules may include, for example, a web configure controller 711, a synchronization policy manager 712, a deployment policy manager 713, and peer communication module 714.

In some embodiments, each web configure controller 711 may be configured to allow a remote user (e.g., administrator 703) to configure the services available on the node on which the web configure controller 711 resides. Furthermore, in some embodiments, the web configure controller may allow the user to configure services on more than one node within a group of related nodes. For example, the web configure controller 711 on first node 701 may allow the administrative the ability to view and/or modify services on either the first node 701, the second node 702, or both nodes. In some embodiments, the web configure controller 711 may enable a user to switch between a normal mode and a synchronization mode for a particular node. This may include allowing the user to switch from a normal display to a synchronization display (e.g., in the same or similar manner as described in reference to FIGS. 3A and 3B). In some embodiments, while in the normal mode, the user may be able to view/modify all services that are associated with (e.g., hosted by) a particular node. In contrast, while in synchronization mode the user may restricted to modifying only services that are associated with a particular synchronization policy.

In some embodiments, each synchronization policy manager 712 may be configured for use in managing (e.g., creating, querying, modifying, deleting) synchronization policies for a particular node. More specifically, the synchronization policy manager may be used, for example, in changing a synchronization policy type (e.g., from strict to relaxed) or removing the node from a particular synchronization policy, so that the services of the node are no longer governed by that particular policy.

In some embodiments, each deployment policy manager 713 may be configured for use in managing (e.g., creating, querying, modifying, deleting) deployment policies for a particular node. As used herein, in some embodiments, a deployment policy may refer to a set of rules that are applied during import of configurations onto a node. A deployment policy may be responsible for accepting, filtering, or modifying a configuration of a node during import of a new node configuration. For example, a user may be able to define a deployment policy such that the service IP address is always replaced with a specific value during a new configuration import. Further, in some embodiments, when a change is implemented on a node in response to a change to a service that is part of a synchronization policy, the deployment policy (which may be different for different nodes) may dictate how the change is specifically implemented. This may occur because, in some embodiments, a synchronization policy may dictate only that changes to services must happen, not how the changes must happen for any particular node. Thus, in some embodiments, a deployment policy manager 713 may be responsible for translating configuration variables into local binding within the node.

In some embodiments, each peer communication module 714 may be configured for use in communication between associated nodes in an environment. This module may be useful, for example, in propagating notices to other nodes of changes in synchronization polices. Each peer communication module 714 may also be used for detecting new synchronization policies as they are created by users on other nodes.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
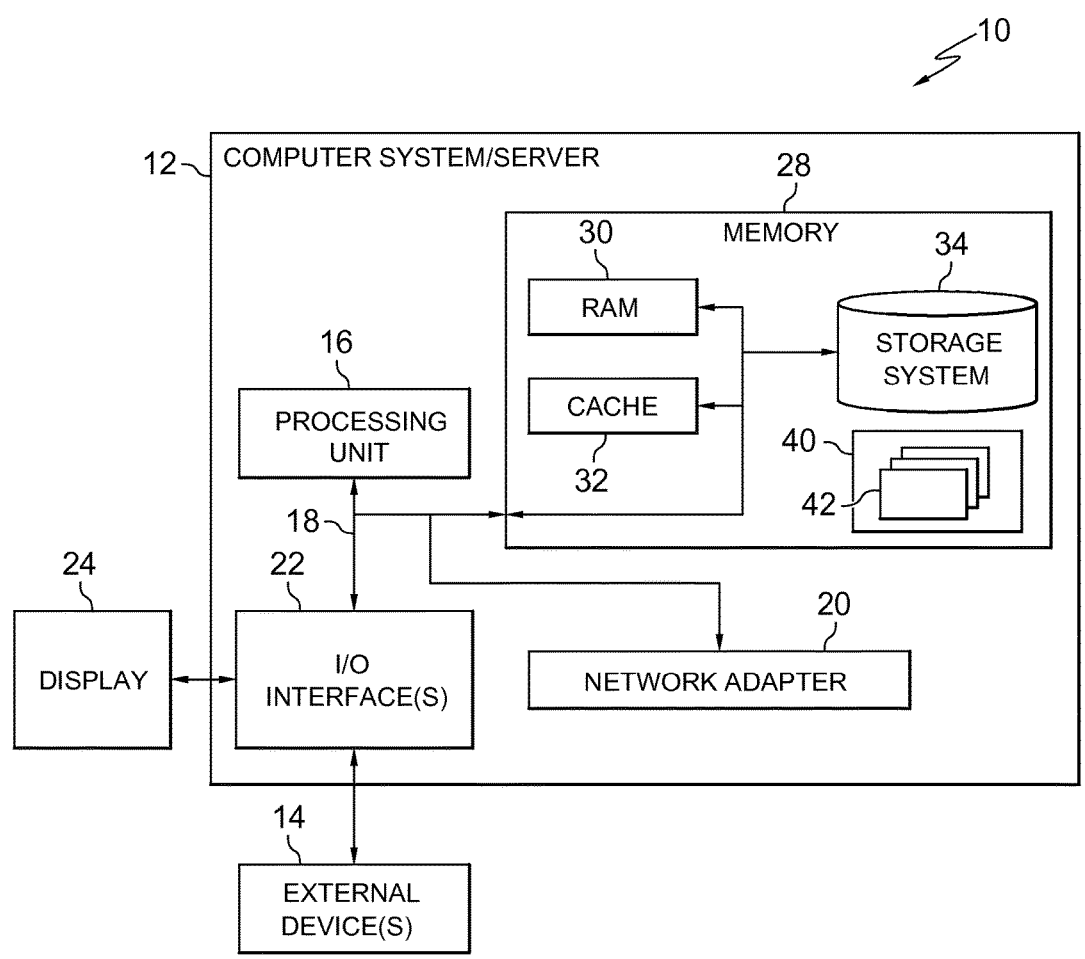
FIG. 8 illustrates a diagram of a cloud computing node, in accordance with embodiments of the present disclosure.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
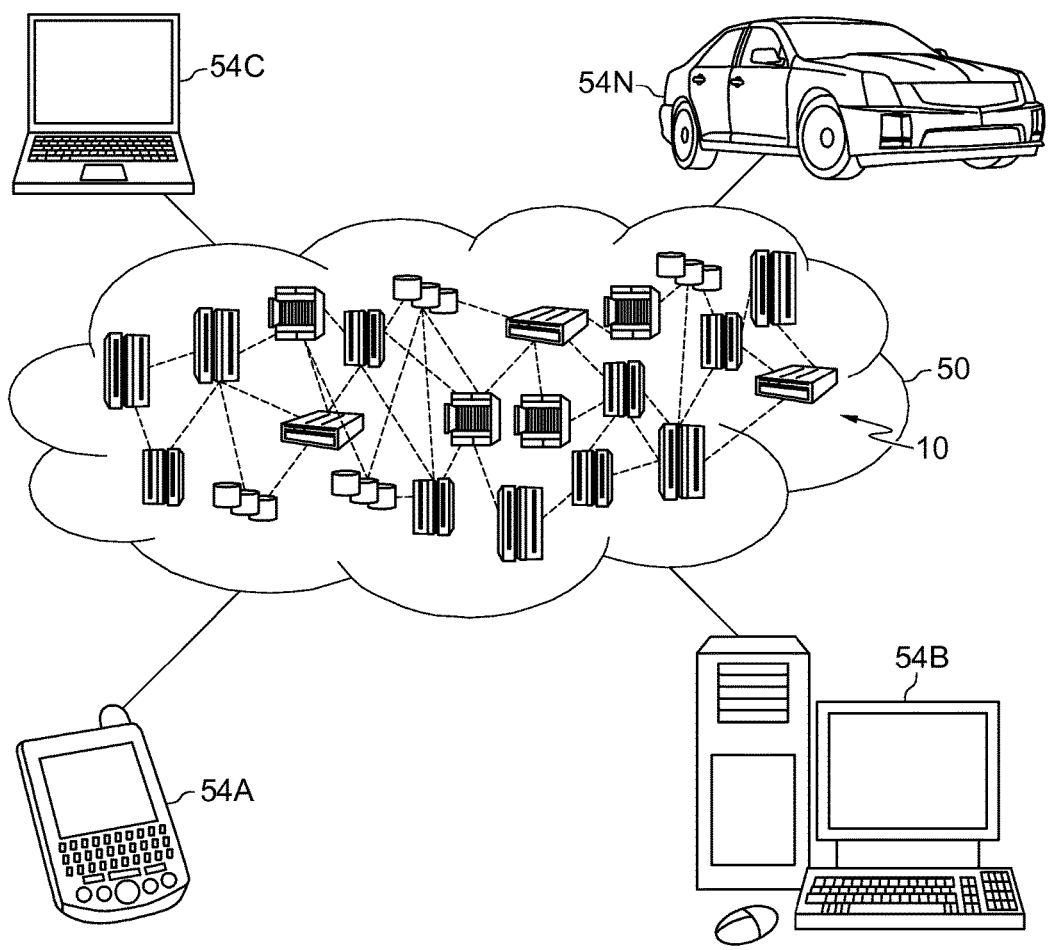
FIG. 9 illustrates a diagram of a cloud computing environment, in accordance with embodiments of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
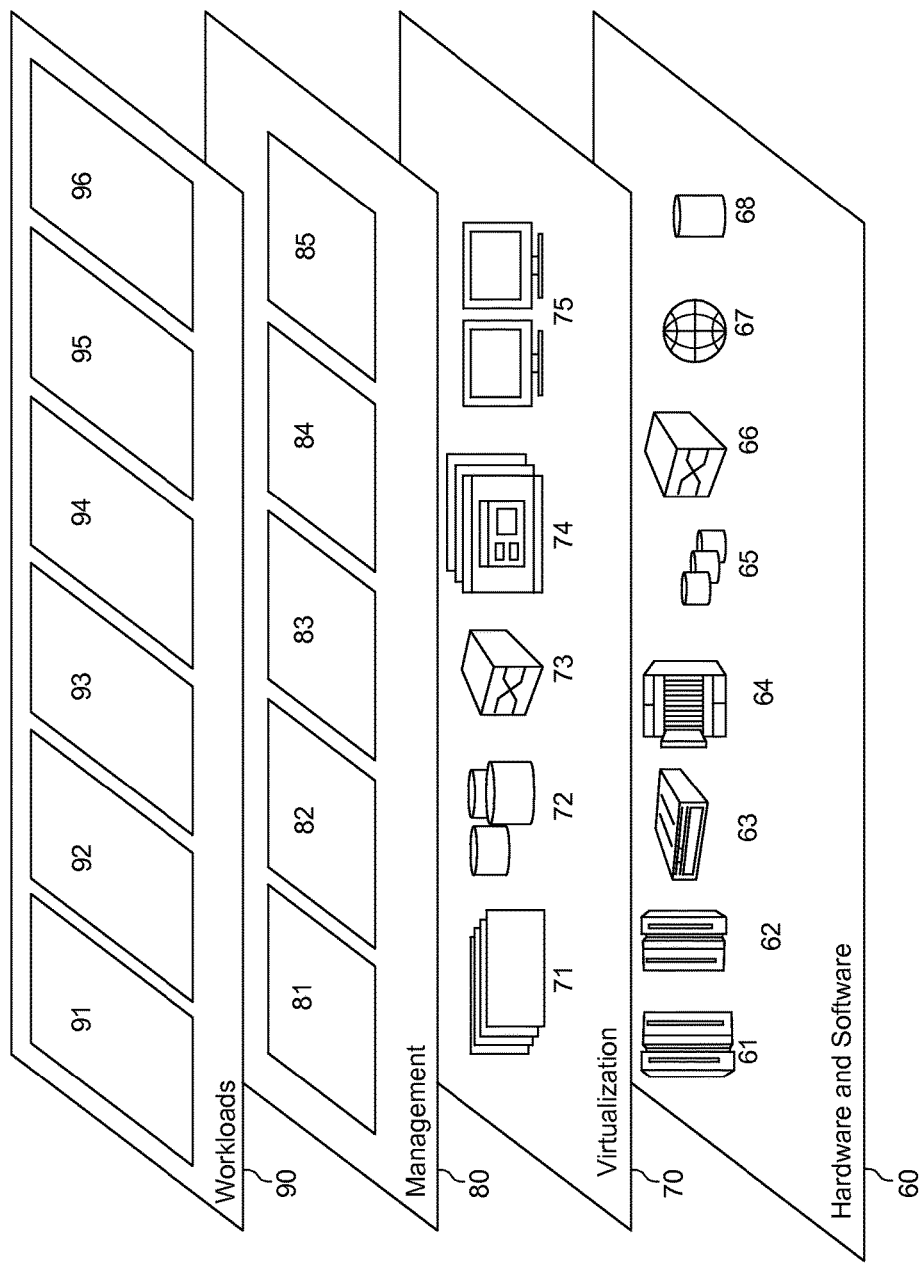
FIG. 10 illustrates a diagram of abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronization policy management 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a set of services associated with a first node and further associated with a second node, the method comprising:
   receiving, at the first node, a request to modify, on the first node, the set of services;
   identifying a synchronization policy associated with the set of services, the synchronization policy requiring that modifications attempted on the set of services on the first node also be attempted on the set of services on the second node;
   attempting, in response to the request to modify the set of services, to modify the set of services on the first node;
   causing, in response to the request to modify the set of services and pursuant to the synchronization policy, the second node to attempt to modify the set of services on the second node;
   identifying that the synchronization policy is a relaxed synchronization policy;
   determining that the attempting to modify the set of services on the second node failed;
   continuing, based on the identifying that the synchronization policy is a relaxed synchronization policy and despite the determining that the attempting to modify the set of services on the second node failed, the attempt to modify the set of services on the first node;
   receiving, at the first node, a second request to modify, on the first node, a second set of services;
   identifying a second synchronization policy associated with the second set of services, the second synchronization policy requiring that modifications attempted on the second set of services on the first node also be attempted on the second set of services on a third node;
   attempting, in response to the second request, to modify the second set of services on the first node;
   causing, in response to the second request and pursuant to the second synchronization policy, the third node to attempt to modify the second set of services on the third node;
   identifying that the second synchronization policy is a strict synchronization policy;
   determining that the attempting to modify the second set of services on the third node failed; and
   discontinuing, based on the identifying that the second synchronization policy is a strict synchronization policy and further based on the determining that the attempting to modify the second set of services on the third node failed, the attempt to modify the second set of services on the first node.

2. The method of claim 1, wherein the second node and the third node are the same.

3. The method of claim 1, wherein the second synchronization policy further requires that modifications attempted on the second set of services on the first node also be attempted on the second set of services on a fourth node, the method further comprising:
   causing, in response to the second request and pursuant to the second synchronization policy, the fourth node to attempt to modify the second set of services on the fourth node; and
   causing, based on the identifying that the second synchronization policy is a strict synchronization policy and further based on the determining that the attempting to modify the second set of services on the third node failed, the attempt to modify the second set of services on the fourth node to be discontinued.

4. The method of claim 1, wherein the synchronization policy further requires that modifications attempted on the set of services on the first node also be attempted on the set of services on a fifth node, the method further comprising:
   causing, in response to the request and pursuant to the synchronization policy, the fifth node to attempt to modify the set of services on the fifth node; and
   continuing to cause, based on the identifying that the synchronization policy is a relaxed synchronization policy and despite the determining, the fifth node to attempt to modify the set of services on the fifth node.

5. The method of claim 1, wherein the receiving the request to modify the set of services occurs while a computer monitor is showing a synchronization display associated with the first node, the method further comprising:
   causing, while in a normal mode, the computer monitor to show a normal display associated with the first node, the normal display, as shown, including a first list of services associated with the first node, the first list including the set of services and further including at least one additional service not associated with the synchronization policy;
   receiving a user request to switch from the normal mode to a synchronization mode; and
   causing, in response to the user request, the computer monitor to show the synchronization display in place of the normal display, the synchronization display, as shown, including a second list of services associated with the first node, the second list including the set of services and not including the at least one additional service.

6. The method of claim 1, wherein the attempting to modify the set of services on the first node occurs via a first deployment policy of the first node, wherein the attempt to modify the set of services on the second node occurs via a second deployment policy of the second node, and wherein the first deployment policy and the second deployment policy are different.

7. A computer program product for managing a set of services associated with a first node and further associated with a second node, the computer program product comprising a computer readable storage medium having program instructions embodied therewith, the program instructions executable by a computer to cause the computer to perform a method comprising:
   receiving, at the first node, a request to modify, on the first node, the set of services;
   identifying a synchronization policy associated with the set of services, the synchronization policy requiring that modifications attempted on the set of services on the first node also be attempted on the set of services on the second node;

attempting, in response to the request to modify the set of services, to modify the set of services on the first node;

causing, in response to the request to modify the set of services and pursuant to the synchronization policy, the second node to attempt to modify the set of services on the second node;

identifying that the synchronization policy is a relaxed synchronization policy;

determining that the attempting to modify the set of services on the second node failed;

continuing, based on the identifying that the synchronization policy is a relaxed synchronization policy and despite the determining that the attempting to modify the set of services on the second node failed, the attempt to modify the set of services on the first node;

receiving, at the first node, a second request to modify, on the first node, a second set of services;

identifying a second synchronization policy associated with the second set of services, the second synchronization policy requiring that modifications attempted on the second set of services on the first node also be attempted on the second set of services on a third node;

attempting, in response to the second request, to modify the second set of services on the first node;

causing, in response to the second request and pursuant to the second synchronization policy, the third node to attempt to modify the second set of services on the third node;

identifying that the second synchronization policy is a strict synchronization policy;

determining that the attempting to modify the second set of services on the third node failed; and discontinuing, based on the identifying that the second synchronization policy is a strict synchronization policy and further based on the determining that the attempting to modify the second set of services on the third node failed, the attempt to modify the second set of services on the first node.

8. The computer program product of claim 7, wherein the second node and the third node are the same.

9. The computer program product of claim 7, wherein the second synchronization policy further requires that modifications attempted on the second set of services on the first node also be attempted on the second set of services on a fourth node, and wherein the method further comprises:

causing, in response to the second request and pursuant to the second synchronization policy, the fourth node to attempt to modify the second set of services on the fourth node; and causing, based on the identifying that the second synchronization policy is a strict synchronization policy and further based on the determining that the attempting to modify the second set of services on the third node failed, the attempt to modify the second set of services on the fourth node to be discontinued.

10. The computer program product of claim 7, wherein the synchronization policy further requires that modifications attempted on the set of services on the first node also be attempted on the set of services on a fifth node, and wherein the method further comprises:

causing, in response to the request and pursuant to the synchronization policy, the fifth node to attempt to modify the set of services on the fifth node; and continuing to cause, based on the identifying that the synchronization policy is a relaxed synchronization policy and despite the determining, the fifth node to attempt to modify the set of services on the fifth node.

11. The computer program product of claim 7, wherein the receiving the request to modify the set of services occurs while a computer monitor is showing a synchronization display associated with the first node, and wherein the method further comprises:

causing, while in a normal mode, the computer monitor to show a normal display associated with the first node, the normal display, as shown, including a first list of services associated with the first node, the first list including the set of services and further including at least one additional service not associated with the synchronization policy;

receiving a user request to switch from the normal mode to a synchronization mode; and causing, in response to the user request, the computer monitor to show the synchronization display in place of the normal display, the synchronization display, as shown, including a second list of services associated with the first node, the second list including the set of services and not including the at least one additional service.

12. The computer program product of claim 7, wherein the attempting to modify the set of services on the first node occurs via a first deployment policy of the first node, wherein the attempt to modify the set of services on the second node occurs via a second deployment policy of the second node, and wherein the first deployment policy and the second deployment policy are different.

13. A first node for managing a set of services associated with the first node and further associated with a second node, the first node comprising:

a memory; and a processor in communication with the memory, wherein the processor is configured to perform a method comprising:

receiving, a request to modify, on the first node, the set of services;

identifying a synchronization policy associated with the set of services, the synchronization policy requiring that modifications attempted on the set of services on the first node also be attempted on the set of services on the second node;

attempting, in response to the request to modify the set of services, to modify the set of services on the first node;

causing, in response to the request to modify the set of services and pursuant to the synchronization policy, the second node to attempt to modify the set of services on the second node;

identifying that the synchronization policy is a relaxed synchronization policy;

determining that the attempting to modify the set of services on the second node failed;

continuing, based on the identifying that the synchronization policy is a relaxed synchronization policy and despite the determining that the attempting to modify the set of services on the second node failed, the attempt to modify the set of services on the first node;

receiving a second request to modify, on the first node, a second set of services;

identifying a second synchronization policy associated with the second set of services, the second synchronization policy requiring that modifications attempted on the second set of services on the first node also be attempted on the second set of services on a third node;

attempting, in response to the second request, to modify the second set of services on the first node;

causing, in response to the second request and pursuant to the second synchronization policy, the third node to attempt to modify the second set of services on the third node;

identifying that the second synchronization policy is a strict synchronization policy;

determining that the attempting to modify the second set of services on the third node failed; and discontinuing, based on the identifying that the second synchronization policy is a strict synchronization policy and further based on the determining that the attempting to modify the second set of services on the third node failed, the attempt to modify the second set of services on the first node.

14. The first node of claim 13, wherein the second node and the third node are the same.

15. The first node of claim 13, wherein the second synchronization policy further requires that modifications attempted on the second set of services on the first node also be attempted on the second set of services on a fourth node, and wherein the method further comprises:

causing, in response to the second request and pursuant to the second synchronization policy, the fourth node to attempt to modify the second set of services on the fourth node; and causing, based on the identifying that the second synchronization policy is a strict synchronization policy and further based on the determining that the attempting to modify the second set of services on the third node failed, the attempt to modify the second set of services on the fourth node to be discontinued.

16. The first node of claim 13, wherein the synchronization policy further requires that modifications attempted on the set of services on the first node also be attempted on the set of services on a fifth node, and wherein the method further comprises:

causing, in response to the request and pursuant to the synchronization policy, the fifth node to attempt to modify the set of services on the fifth node; and continuing to cause, based on the identifying that the synchronization policy is a relaxed synchronization policy and despite the determining, the fifth node to attempt to modify the set of services on the fifth node.

17. The first node of claim 13, wherein the receiving the request to modify the set of services occurs while a computer monitor is showing a synchronization display associated with the first node, and wherein the method further comprises:

causing, while in a normal mode, the computer monitor to show a normal display associated with the first node, the normal display, as shown, including a first list of services associated with the first node, the first list including the set of services and further including at least one additional service not associated with the synchronization policy;

receiving a user request to switch from the normal mode to a synchronization mode; and causing, in response to the user request, the computer monitor to show the synchronization display in place of the normal display, the synchronization display, as shown, including a second list of services associated with the first node, the second list including the set of services and not including the at least one additional service.

* * * * *